(12) United States Patent
Jeon

(10) Patent No.: US 7,662,506 B2
(45) Date of Patent: Feb. 16, 2010

(54) SAFETY DEVICE OF BATTERY

(75) Inventor: Hyung-Woo Jeon, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 786 days.

(21) Appl. No.: 11/269,797

(22) Filed: Nov. 9, 2005

(65) Prior Publication Data
US 2006/0099491 A1    May 11, 2006

(30) Foreign Application Priority Data
Nov. 10, 2004 (KR) .................. 10-2004-0091614

(51) Int. Cl.
*H01M 2/12* (2006.01)
(52) U.S. Cl. .............. 429/53; 429/54; 429/55; 429/56
(58) Field of Classification Search .......... 429/53, 429/61, 54, 55, 56
See application file for complete search history.

(56) References Cited

U.S. PATENT DOCUMENTS

| | | | |
|---|---|---|---|
| 5,585,207 A | 12/1996 | Wakabe et al. | |
| 7,396,600 B2 * | 7/2008 | Watanabe et al. | 429/7 |
| 2004/0157115 A1 | 8/2004 | Bouffard et al. | |
| 2005/0106454 A1 * | 5/2005 | Kozu et al. | 429/175 |

FOREIGN PATENT DOCUMENTS

| | | | |
|---|---|---|---|
| EP | 0 756 338 A1 | | 1/1997 |
| JP | 2000-82457 A | | 3/2000 |
| JP | 2000082457 | * | 3/2000 |
| JP | 2003-77434 A | | 3/2003 |
| JP | 2004-6213 A | | 1/2004 |
| JP | 2004-221025 A | | 8/2004 |
| KR | 1997-0054709 A | | 7/1997 |
| WO | WO 03/043106 A1 | | 5/2003 |

* cited by examiner

Primary Examiner—Dah-Wei D Yuan
Assistant Examiner—Patricia Davis
(74) Attorney, Agent, or Firm—Birch, Stewart, Kolasch & Birch, LLP

(57) ABSTRACT

A safety device of a battery including a pressure releasing unit provided at a cell and the battery, in which the pressure releasing unit is configured to release an internal pressure within the cell when the internal pressure of the cell exceeds a predetermined set pressure. Also included is a space member covering the pressure releasing unit and configured to form an empty space around the pressure releasing unit such that when the internal pressure of the cell exceeds the predetermined set pressure, the released internal pressure is released into the empty space formed by the space member.

16 Claims, 6 Drawing Sheets

SAFETY DEVICE OF BATTERY

This application is related to Korean Patent Application No. 10-2004-0091614 filed in Korea on Nov. 10, 2004, the entire contents of which is incorporated in its entirety.

BACKGROUND OF THE INVENTION

1. Field of the Invention

The present invention relates to a battery of a mobile terminal, and more particularly to a safety device for a battery that improves the safety of the battery by smoothly releasing an internal pressure of the battery when the internal pressure of the battery exceeds a predetermined pressure.

2. Description of the Related Art

A mobile communication terminal can be carried with a user allowing him or her to call another party while moving about. Further, the mobile terminal generally includes a detachable battery for supplying power to the terminal. The battery can also be recharged after it has been used for a certain period of time to thereby reuse the battery.

In addition, a mobile terminal battery is commonly a lithium battery. In the lithium battery, lithium ions are generated by oxidation from poles formed of lithium oxide, and the lithium ions move through an electrolyte and are reduced by reduction from a negative pole formed of material such as carbon or the like, thereby generating electric energy. The generated electric energy is then used to operate the mobile terminal.

For example, FIG. 1 is a perspective view illustrating one example of a related art battery, and FIG. 2 is a perspective illustrating the related battery without a cover member.

As shown in FIGS. 1 and 2, the related art battery includes a hexahedral-shaped cell 100 filled with an electrolyte or the like, and a protection circuit assembly 200 connected to one side of the cell 100. The protection circuit assembly 200 stabilizes a current within the cell 100 when electric discharge or recharge occurs within the cell. Also shown is a cover member 300 surrounding and protecting the protection circuit assembly 200 and reinforcing a coupling force between the protection circuit assembly 200 and the cell 100.

Further, the cell 100 is formed of an aluminum material and is hermetically sealed. The protection circuit assembly 200 also include terminals 210 respectively connected to a terminal portion of the cell 100. In addition, the cover member 300 is formed using a low temperature, lower pressure injection method with resin, such as a synthetic resin of a nylon series, after the protection circuit assembly 200 is connected to the cell 100.

In addition, if an overcharged state or a high temperature state of the battery is maintained while the battery is being used, an internal pressure of the cell 100 increases, which causes the cell 100 to eventually explode after the internal pressure exceeds a certain pressure. The explosion of the battery not only damages the mobile terminal but may also injure the user. Therefore, research is currently being conducted on how to prevent this from happening.

One method of providing a safe battery is shown in FIG. 3. In this method, the cell 100 is provided with a pressure releasing portion 110 for releasing the internal pressure when the pressure of the cell 100 exceeds a set pressure. As shown, the releasing portion 110 is provided on a side surface of the cell 100. Further, the releasing portion 110 is coupled with the protection circuit assembly 200, and has a certain area and a thickness that is smaller than other portions of the cell 100.

Namely, the pressure releasing portion 110 is formed via a groove with a certain area and depth formed in one side of the cell 100.

In such a structure, when the internal pressure of the cell 100 is increased, the pressure releasing portion 110 having a relatively small thickness is torn. Thus, the internal pressure of the cell 100 is released before the cell 100 explodes.

However, as shown in FIG. 4, the molten injection material of the cover member 300 is filled in the groove forming the pressure releasing portion 110 and is solidified in an injection molding process to tightly couple the cell 100 and the protection circuit assembly 200 and to encompass the protection circuit assembly 200. Thus, the cover member 300 blocks the pressure releasing portion 110. Further, because the cover member 300 blocks the pressure releasing portion 110, the pressure releasing portion 110 is not normally operated (i.e., is not easily torn), which may cause the cell 100 to explode.

SUMMARY OF THE INVENTION

Accordingly, one object of the present invention is to address the above-noted and other problems.

Another object of the present invention is to provide a safety device that improves the safety of the battery by smoothly releasing the internal pressure of the battery when the internal pressure reaches or exceeds a predetermined set pressure.

To achieve these and other advantages and in accordance with the purpose of the present invention, as embodied and broadly described herein, there is provided a safety device of a battery. The safety device according to one aspect of the present invention includes a pressure releasing unit provided at a cell of the battery, in which the pressure releasing unit is configured to release an internal pressure within the cell when the internal pressure of the cell exceeds a predetermined set pressure. Also included is a space member covering the pressure releasing unit and configured to form an empty space around the pressure releasing unit such that when the internal pressure of the cell exceeds the predetermined set pressure, the released internal pressure is released into the empty space formed by the space member.

According to another aspect of the present invention, there is provided a battery for a mobile communication terminal including a battery cell configured to provide a power source for the mobile terminal, a protection circuit assembly attached to a surface of the battery cell and configured to stabilize the power source within the battery cell when the battery is charged or discharged and a cover member configured to cover the protection circuit assembly and to couple the protection circuit assembly to the battery cell. Also included is a pressure releasing unit provided at a cell of the battery, in which the pressure releasing unit is configured to release an internal pressure within the cell when the internal pressure of the cell exceeds a predetermined set pressure, and a space forming member covering the pressure releasing unit and configured to form an empty space around the pressure releasing unit such that when the internal pressure of the cell exceeds the predetermined set pressure, the released internal pressure is released into the empty space formed by the space member.

Further scope of applicability of the present invention will become apparent from the detailed description given hereinafter. However, it should be understood that the detailed description and specific examples, while indicating preferred embodiments of the invention, are given of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
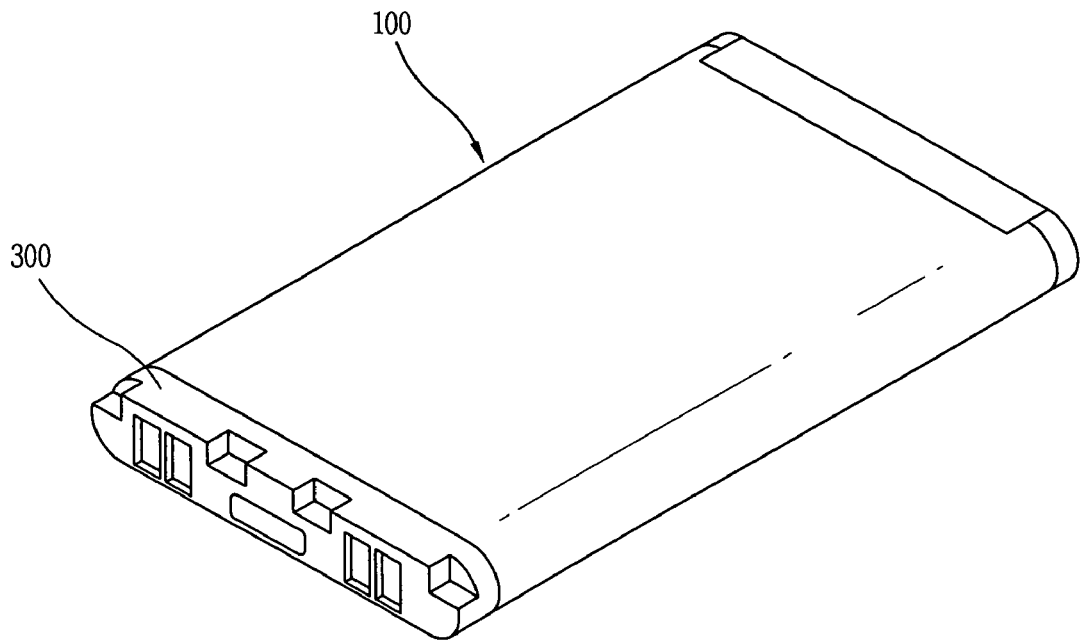
FIG. 1 is a perspective view illustrating a related art battery.
Figure 2:
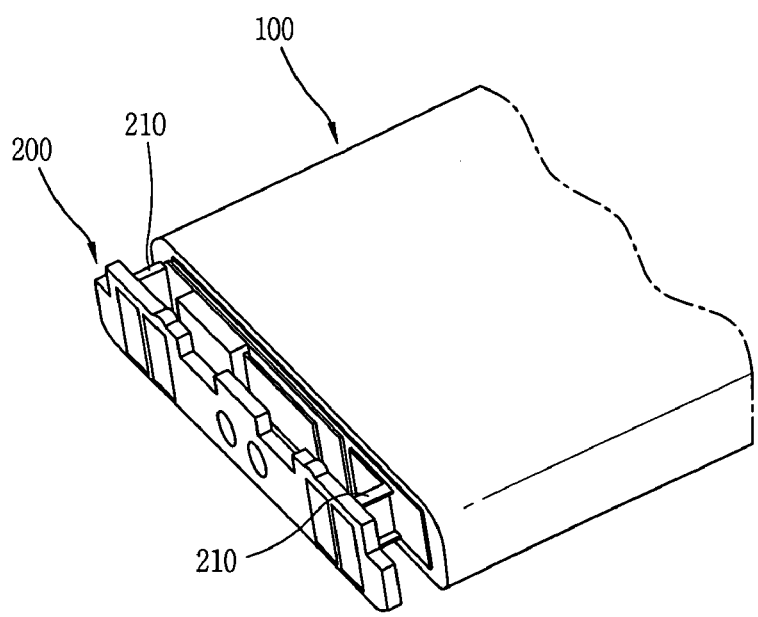
FIG. 2 is a perspective view illustrating the related art battery without a cover member.
Figure 3:
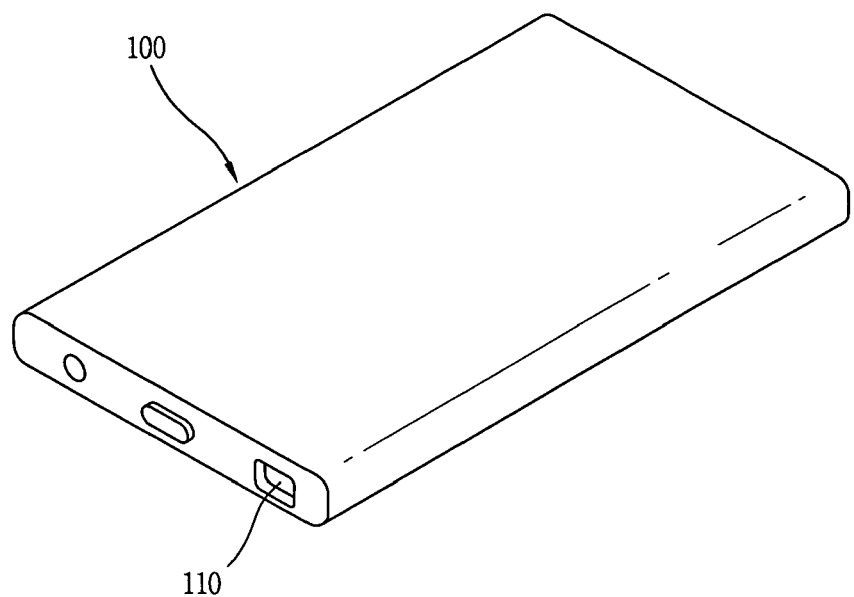
FIG. 3 is a perspective view illustrating a safety device for the related art battery.
Figure 4:
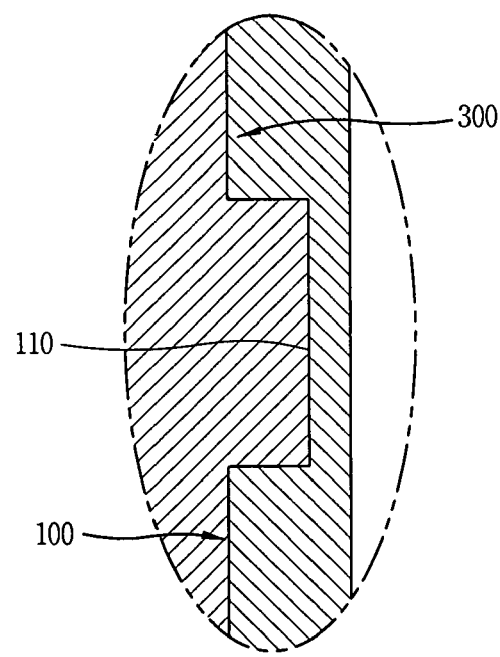
FIG. 4 is a sectional view illustrating injection material filled in the safety structure of the related art battery.
Figure 5:
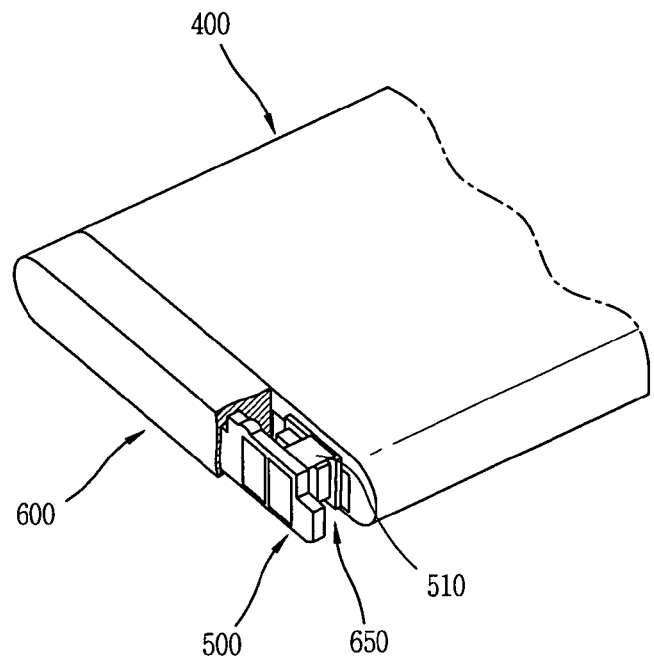
FIG. 5 is a perspective view illustrating a battery including a battery safety device according to one embodiment of the present invention.
Figure 6:
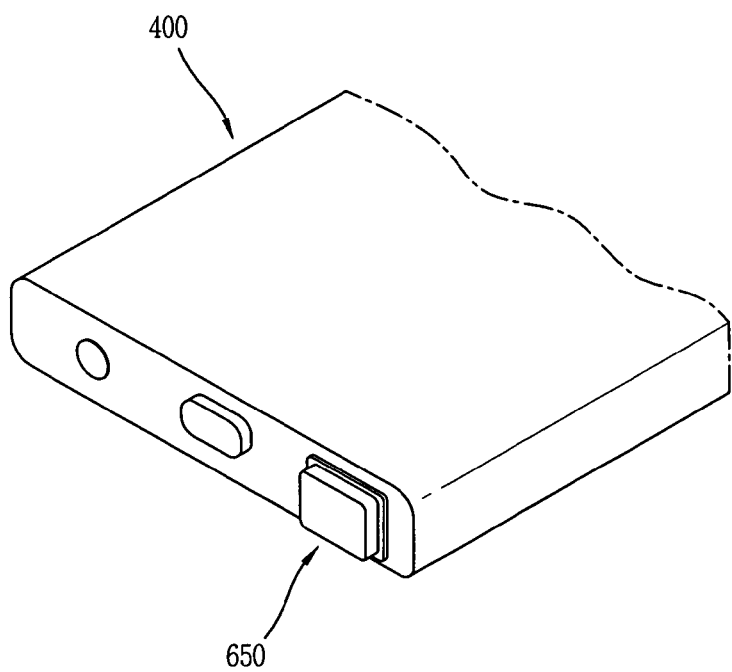
FIG. 6 is a perspective view illustrating a space forming cap included in the battery safety device.
Figure 7:
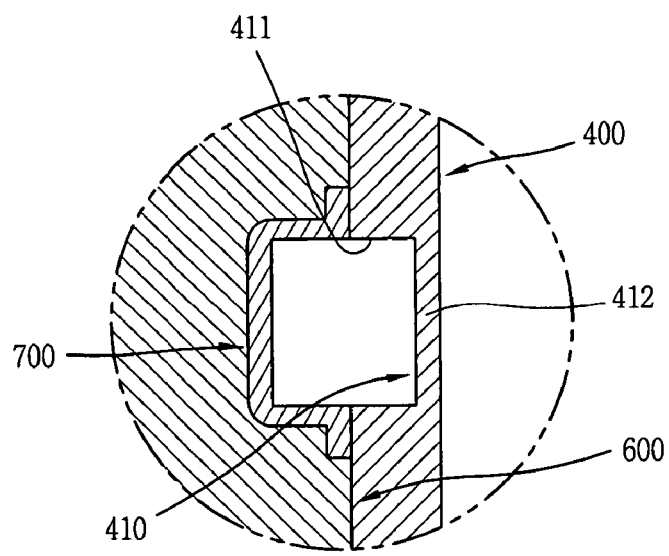
FIG. 7 is a sectional view illustrating the battery safety device according to the present invention.

FIGS. 5-7 illustrate a battery safety device according to the present invention. As shown in FIG. 5, the battery includes a cell 400 filled with an electrolyte or the like, a protection circuit assembly 500 connected to one side of the cell 400, a cover member 600 covering and protecting the protection circuit assembly 500 and reinforcing a coupling force between the protection circuit assembly 500 and the cell 400, and a safety device 650 for releasing the internal pressure of the cell 400 when the internal pressure of the cell 400 exceeds a predetermined set pressure.

Further, the cell 400 has a hexahedral shape and is preferably made of aluminum. To fabricate the cell 400, an electrolyte or the like is inserted into a can having one open side, and then the opened side of the can is covered with a plate. The plate may be bonded to the can by laser welding, etc. Thus, the cell 400 is in a hermetically closed state.

In addition, the protection circuit assembly 500 includes terminals 510 respectively connected to a terminal portion (not shown) of the cell 400. The terminals 510 and the terminal portion of the cell 400 may be bonded together by spot welding, etc. The protection assembly 500 also stabilizes a current when the battery is charged and discharged. Further, the cover member 600 is preferably formed using an injection-molding process with resin of a nylon series after the protection circuit assembly 500 is connected to the cell 400. FIG. 6 illustrates the safety device 650 without the protection assembly 500 and the cover member 600.

As shown in greater detail in FIG. 7, the safety device 650 shown in FIGS. 5 and 6 includes a pressure releasing unit 410 for releasing the internal pressure of the cell 400 when the internal pressure of the cell 400 exceeds a predetermined set pressure. The safety device 650 also includes a space forming cap 700 placed between the cell 400 and the cover member 600. The cap 700 covers the pressure releasing unit 410 and forms a space above the pressure releasing unit 410.

Further, the pressure releasing unit 410 includes a thin film portion 412 having a thickness smaller than other portions of the cell 400 and which is formed via a groove 411 having a predetermined area and depth. Also, the groove 411 is formed at an outer surface of the cell 400, and the pressure releasing unit 410 is provided on a surface of the cell 400 to which the protection circuit assembly 500 is coupled.

In addition, the space forming cap 700 has a cap shape with an opened side and is provided above at the thin film portion 412 formed in the surface of the cell 400. Thus, the cap 700 forms a predetermined space above the pressure releasing unit 410. The cover member 600 is also coupled to encompass the space forming cap 700.

One method of coupling the cover member 600 to the space forming cap 700 is as follows. First, the protection circuit assembly 500 is coupled to the front surface of the cell 400 and the space forming cap 700 is attached to the front surface of the cell 400 to cover the pressure releasing unit 410. Then, the cover member 600 is formed using a low temperature, low pressure injection method to encompass the protection circuit assembly 500 and the cell 400. Note, the space forming cap 700 prevents molten material from being introduced into the space covered by the cap 700. Insertion molding may also be used as another method of coupling the cover member 600 with the space forming cap 700.

Further, the space forming cap 700 is preferably formed of a material whose melting temperature is higher than that of the cover member 600. For example, the cover member 600 may be formed of a synthetic resin of a nylon series, and the space forming cap 700 may be formed of a heat resistant synthetic resin, preferably LCP (Liquid Crystalline Polyester). The cap 700 may also be made using a metallic material. However, metallic material is generally more expensive than synthetic resin and is generally not able to be integrally coupled with the cover member 700, thereby possibly degrading the durability of the coupled member. Therefore, using synthetic resin is generally preferably because it is cheaper and can be integrally coupled with the cover member 600.

Thus, according to the present invention, when the internal pressure of the cell 400 exceeds a predetermined set pressure, the thin portion 412 of the pressure releasing unit 410 breaks or tears, thereby releasing the internal pressure into the space formed by the space forming cap 700.

Figure 8:
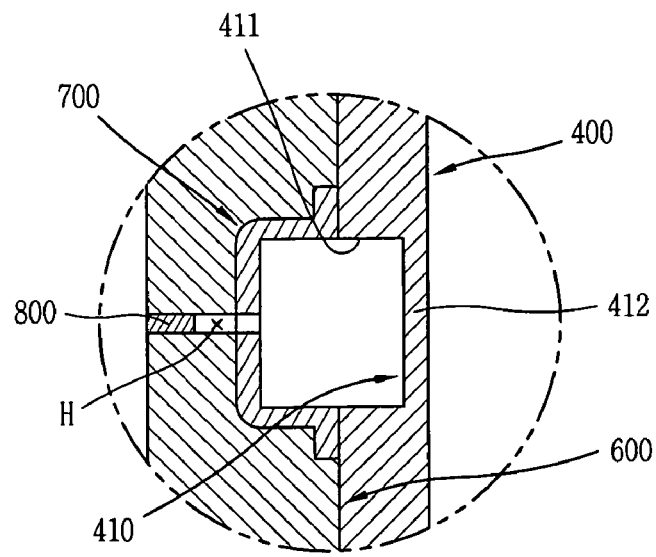
FIGS. 8, 9 and 10 are sectional views illustrating the battery safety device according to different embodiments of the present invention.

FIG. 8 illustrates another embodiment of the invention in which a through hole (H) is provided through the cover member 600 and space forming cap 700. Further, an auxiliary pin 800 is inserted to thereby block the through hole (H). In this embodiment, when the internal pressure of the cell 400 exceeds the predetermined set pressure, the pressure is released through the pressure releasing unit 410, and the auxiliary pin 800 is separated from the hole (H) because of the released pressure, thereby releasing the pressure to the outside of the battery.

Figure 9:
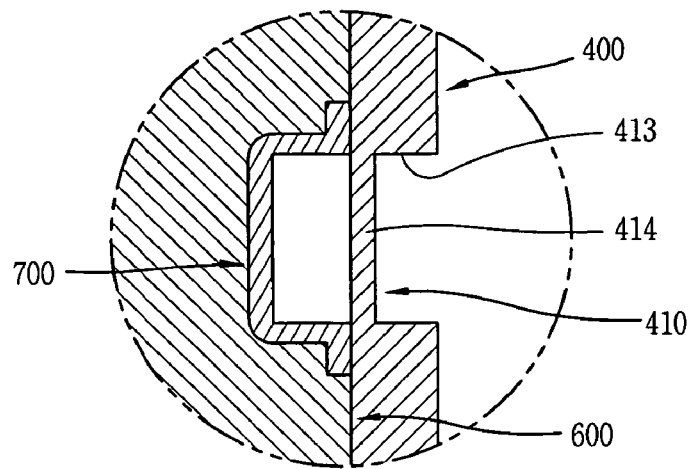

FIG. 9 illustrates another embodiment of the pressure releasing unit 410. As shown, the pressure releasing unit 410 includes a thin film portion 414 having a thickness smaller than other portions of the cell 400 and which is formed via a groove 413 formed at an inner wall of the cell 400. Namely, the groove 413 is formed at an inner surface of the cell 400 thereby forming the thin film portion 414. Note, the thin film portion 414 is formed on an opposite side of the front surface of the cell 400 compared to the thin film portion 412 in FIG. 7.

Figure 10:
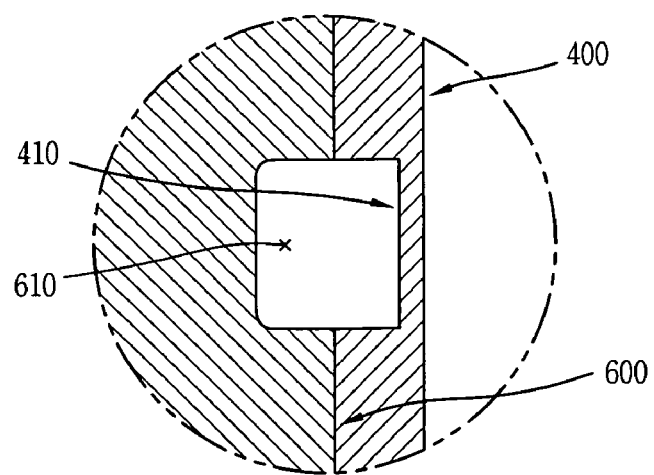

Next, FIG. 10 illustrates another embodiment of the pressure releasing unit 410. In more detail, FIG. 10 illustrates the pressure releasing unit 410 including a space portion 610 formed in the cover member 600 and encompassing the protection circuit assembly 500. Further, the space portion 610 is placed at a portion facing the pressure releasing unit 410. Namely, the space portion 610 is formed in the cover member 600 without using the aforementioned space forming cap 700. The cover member 600 may also be formed by injection molding or may be formed as a separate member to be coupled to the cell 400.

Figure 11:
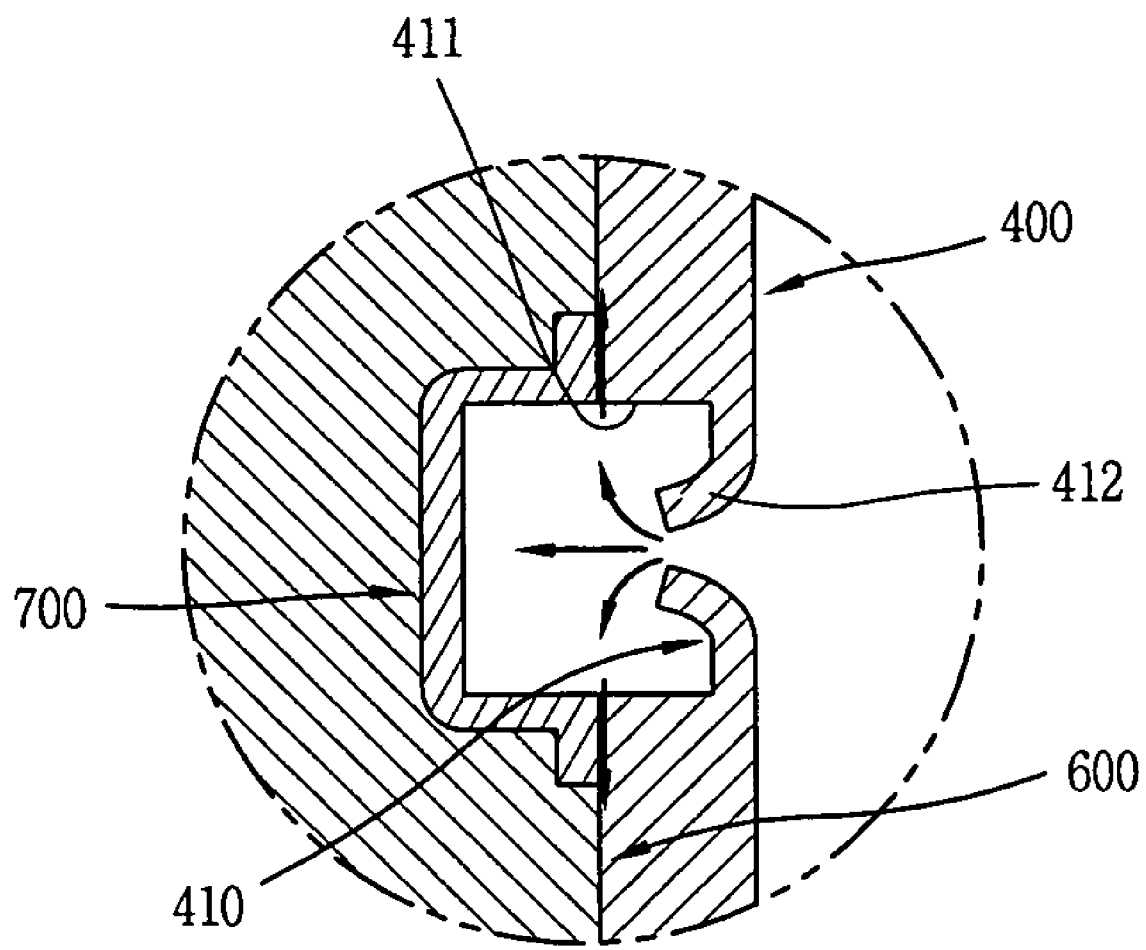
FIG. 11 is a sectional view illustrating an operational state of the battery safety device according to the present invention.

An operational effect of the battery of the present invention will now be described with reference to FIG. 11.

The battery provided with the battery safety device according to the present invention is detachably mounted to a mobile terminal or the like and is used as a power supply source. When the battery is totally discharged, the battery may be separated from the mobile terminal and recharged. Further, as shown in FIG. 11, when the internal pressure in the cell 400 reaches or exceeds a predetermined set pressure (e.g., because the battery is over-charged or has been maintained at high temperature state), the thin portion 412 of the pressure releasing unit 410 breaks or tears and the pressure within the cell 400 is released into the space formed by the space forming cap 700 (or from the space portion 610).

In addition, if the through hole (H) and auxiliary pin 800 are included as shown in FIG. 8, the pressure is released to the outside of the battery through the through hole (H) as the auxiliary pin 800 is separated from the through hole (H) by the released pressure.

Further, in the present invention, when the cover member 600 is formed by an injection molding process, for example, after the space forming cap 700 is provided on the cell 400, an injection material for forming the cover member 600 does not block the pressure releasing unit 410 due to the space forming cap 700. Thus, because a predetermined space is formed above the pressure releasing unit 410, the pressure releasing unit 410 is not blocked and thus is accurately operated.

As described so far, in the safety device of the battery according to the present invention, when the internal pressure of the cell exceeds a set predetermined pressure, the pressure releasing unit is accurately operated to release the pressure of the cell. Thus, the battery is prevented from exploding so that the reliability of the battery is improved and the user is protected from injury caused by the explosion of the battery.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A safety device of a battery, comprising:
   a pressure releasing unit provided at a cell of the battery, said pressure releasing unit configured to release an internal pressure within the cell when the internal pressure of the cell exceeds a predetermined set pressure;
   a protection circuit assembly coupled to a surface of the cell provided with the pressure releasing unit;
   a space forming member formed of a first resin and covering the pressure releasing unit; and
   an injection-molded cover member formed of a second resin and configured to encompass the space forming member and the protection circuit assembly,
   wherein the space forming member is configured to form an empty space around the pressure releasing unit such that when the internal pressure of the cell exceeds the predetermined set pressure, the released internal pressure is released into the empty space formed by the space member, and
   wherein a melting temperature of the first resin is higher than a melting temperature of the second resin so as to prevent molten material of the cover member from being introduced into the empty space.

2. A safety device of a battery, comprising:
   a pressure releasing unit provided at a cell of the battery, said pressure releasing unit configured to release an internal pressure within the cell when the internal pressure of the cell exceeds a predetermined set pressure;
   a space forming member covering the pressure releasing unit and configured to form an empty space around the pressure releasing unit such that when the internal pressure of the cell exceeds the predetermined set pressure, the released internal pressure is released into the empty space formed by the space member;
   a protection circuit assembly coupled to a surface of the cell provided with the pressure releasing unit;
   an injection-molded cover member encompassing the space forming member and the protection circuit assembly;
   a through hole formed through the cover member and the space forming member and configured to allow the empty space formed around the pressure releasing unit to communicate with an outside of the cover member; and
   an auxiliary pin inserted in the through hole and configured to be pushed out of the through hole when the pressure is released into the empty space.

3. The device of claim 1, wherein the first resin comprises liquid crystalline polyester (LCP).

4. The device of claim 1, wherein the pressure releasing unit includes a thin film portion configured to break or tear when the internal pressure of the cell exceeds the predetermined set pressure.

5. The device of claim 4, wherein a groove is formed at an outer surface of the cell to form the thin film portion of the pressure releasing unit.

6. The device of claim 4, wherein a groove is formed at an inner surface of the cell to form the thin film portion of the pressure releasing unit.

7. The device of claim 1, wherein the space forming member comprises a space forming cap covering the pressure releasing unit.

8. The device of claim 1, wherein the space forming member comprises an injection-molded space portion formed in the cover member and being placed at a position facing the pressure releasing unit.

9. A battery for a mobile communication terminal, comprising:
   a battery cell configured to provide a power source for the mobile terminal;
   a protection circuit assembly attached to a surface of the battery cell and configured to stabilize the power source within the battery cell when the battery is charged or discharged;

a cover member formed of a first resin and configured to cover the protection circuit assembly and to couple the protection circuit assembly to the battery cell;

a pressure releasing unit provided at a cell of the battery, said pressure releasing unit configured to release an internal pressure within the cell when the internal pressure of the cell exceeds a predetermined set pressure; and a space forming member formed of a second resin and configured to cover the pressure releasing unit and to form an empty space around the pressure releasing unit such that when the internal pressure of the cell exceeds the predetermined set pressure, the released internal pressure is released into the empty space formed by the space member, wherein a melting temperature of the second resin is higher than a melting temperature of the first resin so as to prevent molten material of the cover member from being introduced into the space.

10. A battery for a mobile communication terminal, comprising:

a battery cell configured to provide a power source for the mobile terminal;

a protection circuit assembly attached to a surface of the battery cell and configured to stabilize the power source within the battery cell when the battery is charged or discharged;

a cover member configured to cover the protection circuit assembly and to couple the protection circuit assembly to the battery cell;

a pressure releasing unit provided at a cell of the battery, said pressure releasing unit configured to release an internal pressure within the cell when the internal pressure of the cell exceeds a predetermined set pressure;

a space forming member covering the pressure releasing unit and configured to form an empty space around the pressure releasing unit such that when the internal pressure of the cell exceeds the predetermined set pressure, the released internal pressure is released into the empty space formed by the space member;

a through hole formed through the cover member and the space forming member and configured to allow the empty space formed around the pressure releasing unit to communicate with an outside of the cover member; and an auxiliary pin inserted in the through hole and configured to be pushed out of the through hole when the pressure is released into the empty space.

11. The battery of claim 10, wherein a material of the space forming member comprises liquid crystalline polyester (LCP).

12. The battery of claim 9, wherein the pressure releasing unit includes a thin film portion configured to break or tear when the internal pressure of the cell exceeds the predetermined set pressure.

13. The battery of claim 12, wherein a groove is formed at an outer surface of the cell to form the thin film portion of the pressure releasing unit.

14. The battery of claim 12, wherein a groove is formed at an inner surface of the cell to form the thin film portion of the pressure releasing unit.

15. The battery of claim 9, wherein the space forming member comprises a space forming cap covering the pressure releasing unit.

16. The battery of claim 9, wherein the space forming member comprises an injection-molded space portion formed in the cover member and being placed at a position facing the pressure releasing unit.

* * * * *